US011173441B2

(12) United States Patent
Sutton

(10) Patent No.: US 11,173,441 B2
(45) Date of Patent: Nov. 16, 2021

(54) FILTER SYSTEM

(71) Applicant: Global Vacuum Systems, Navasota, TX (US)

(72) Inventor: Leland Carl Sutton, Navasota, TX (US)

(*) Notice: Subject to any disclaimer, the term of this patent is extended or adjusted under 35 U.S.C. 154(b) by 23 days.

(21) Appl. No.: 16/282,273

(22) Filed: Feb. 21, 2019

(65) Prior Publication Data

US 2020/0054980 A1    Feb. 20, 2020

Related U.S. Application Data

(60) Provisional application No. 62/633,603, filed on Feb. 21, 2018.

(51) Int. Cl.
| | | |
|---|---|---|
| *B01D 46/00* | (2006.01) | |
| *B01D 46/24* | (2006.01) | |
| *B01D 50/00* | (2006.01) | |
| *B04C 9/00* | (2006.01) | |
| *B01D 46/02* | (2006.01) | |

(52) U.S. Cl.
CPC ..... *B01D 46/2403* (2013.01); *B01D 46/0005* (2013.01); *B01D 46/0067* (2013.01); *B01D 46/02* (2013.01); *B01D 50/002* (2013.01); *B04C 9/00* (2013.01); *B04C 2009/004* (2013.01)

(58) Field of Classification Search
CPC .. B01D 46/02; B01D 46/2403; B01D 50/002; B01D 46/0005; B01D 46/0067
USPC ......................................... 55/302, 341.1, 374
See application file for complete search history.

(56) References Cited

U.S. PATENT DOCUMENTS 6,887,290 B2 * 5/2005 Strauser ............... B01D 50/002
55/283

* cited by examiner

*Primary Examiner* — Robert A Hopkins
(74) *Attorney, Agent, or Firm* — Shannon Warren

(57) ABSTRACT

A filter system. The filter system comprises a baghouse head assembly, a baghouse lower assembly and a baghouse inside shell assembly. The baghouse head assembly and the baghouse lower assembly are configured to selectively close and open between an open configuration and a closed configuration. The baghouse inside shell assembly comprises an upper surface and a one or more bag filters. The filter system comprises a lower cavity and an upper cavity. The lower cavity comprises a space between a side portion of the baghouse lower assembly and a shell of the baghouse inside shell assembly. The upper cavity comprises a space between the upper surface of the baghouse inside shell assembly and a lid portion or the baghouse head assembly. The one or more bag filters are configured to filter air flow between the lower cavity and the upper cavity.

16 Claims, 20 Drawing Sheets

FILTER SYSTEM

CROSS-REFERENCE TO RELATED APPLICATIONS

This application claims benefit to U.S. Patent Application No. 62/633,603 filed on Feb. 21, 2018.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

Prior art known to the Applicant includes U.S. Pat. No. 6,887,290B2

BRIEF SUMMARY OF THE INVENTION

A filter system. Said filter system comprises a baghouse head assembly, a baghouse lower assembly and a baghouse inside shell assembly. Said baghouse head assembly and said baghouse lower assembly are configured to selectively close and open between an open configuration and a closed configuration. Said baghouse inside shell assembly comprises an upper surface and a one or more bag filters. Said filter system comprises a lower cavity and an upper cavity. Said lower cavity comprises a space between a side portion of said baghouse lower assembly and a shell of said baghouse inside shell assembly. Said upper cavity comprises a space between said upper surface of said baghouse inside shell assembly and a lid portion or said baghouse head assembly. Said one or more bag filters are configured to filter air flow between said lower cavity and said upper cavity. An inlet and an outlet are in fluid connection with one another through said lower cavity, said one or more bag filters and said upper cavity.

Said filter system. Said filter system comprises said baghouse head assembly, said baghouse lower assembly and said baghouse inside shell assembly. Said baghouse head assembly and said baghouse lower assembly are configured to selectively close and open between said open configuration and said closed configuration. Said baghouse inside shell assembly comprises said upper surface and said one or more bag filters. Said filter system comprises said lower cavity and said upper cavity. Said lower cavity comprises a space between said side portion of said baghouse lower assembly and said shell of said baghouse inside shell assembly. Said upper cavity comprises a space between said upper surface of said baghouse inside shell assembly and said lid portion or said baghouse head assembly. Said one or more bag filters are configured to filter air flow between said lower cavity and said upper cavity. Said inlet and said outlet are in fluid connection with one another through said lower cavity, said one or more bag filters and said upper cavity. Said filter system is mounted on a service vehicle. Said baghouse head assembly and said baghouse lower assembly comprise a vessel mounted on said service vehicle. Said filter system comprise a one or more latches and a hinge assembly. Said baghouse head assembly and said baghouse lower assembly are rotateably attached to one another with said hinge assembly. Said one or more latches are configured to selectively seal said baghouse head assembly and said baghouse lower assembly together. Said one or more bag filters each comprise a bag cage and a bag portion. Said bag portion comprise a textile configured to capture debris between said inlet and said outlet. Said baghouse inside shell assembly comprises said upper surface between said lower cavity and said upper cavity. Said upper surface comprises a planar surface dividing a shell cavity within said baghouse lower assembly. Said upper surface of said shell of said baghouse inside shell assembly comprises said one or more bag filters protruding therefrom. said upper surface of said shell of said baghouse inside shell assembly comprises a circumference plate, a declined plate and a step-up plate. Said declined plate is angled down from said circumference plate to expose a ducting aperture in a side portion of said baghouse lower assembly. Said ducting aperture is below said circumference plate. Said filter system further comprises a bag blower rings in said baghouse head assembly. Said bag blower rings are aligned with a portion of said one or more bag filters. A blowdown inlet pipe are configured receive and blow air through said bag blower rings and into a portion of said one or more bag filters.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
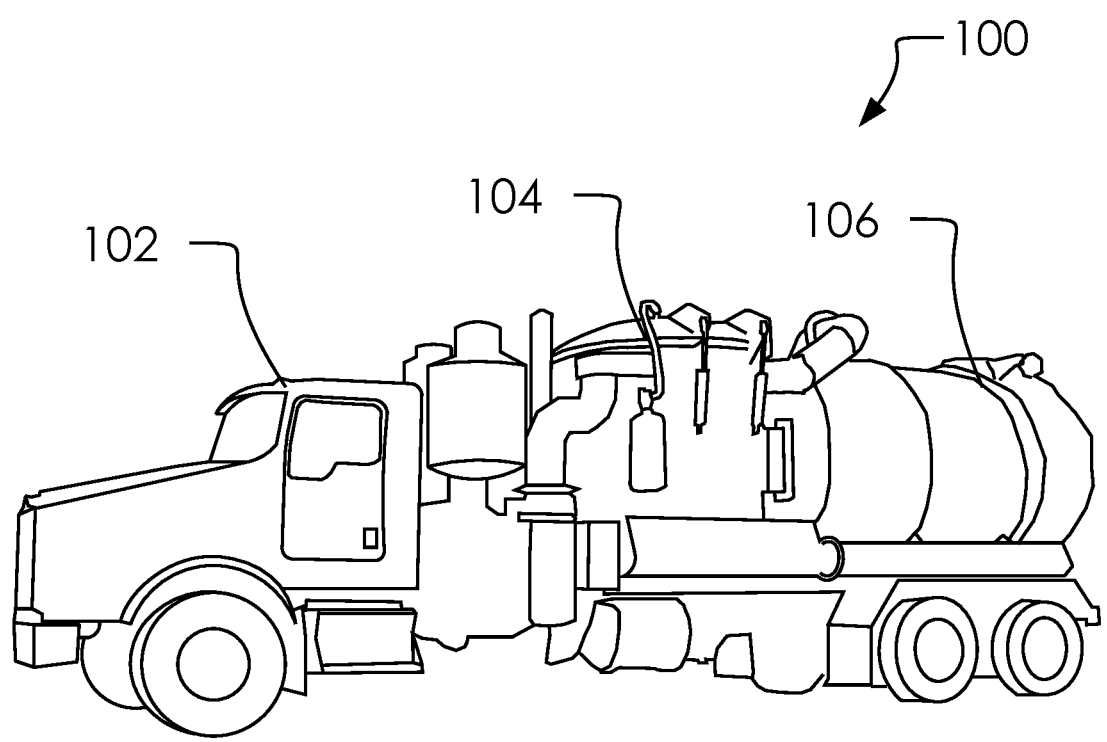
FIG. 1 illustrates a perspective overview view of a service vehicle 102 with a filter system 100.

FIG. 1 illustrates a perspective overview view of a service vehicle 102 with a filter system 100.

In one embodiment, said filter system 100 can be used in conjunction with said service vehicle 102 and a vessel 104. In one embodiment, said service vehicle 102 can comprise a vacuum truck, as is known in the art. In one embodiment, said filter system 100 can filter particulates in fluid streams being collected by said service vehicle 102.

In one embodiment, said service vehicle 102 can comprise said vessel 104 and a hopper 106.

Figure 2:
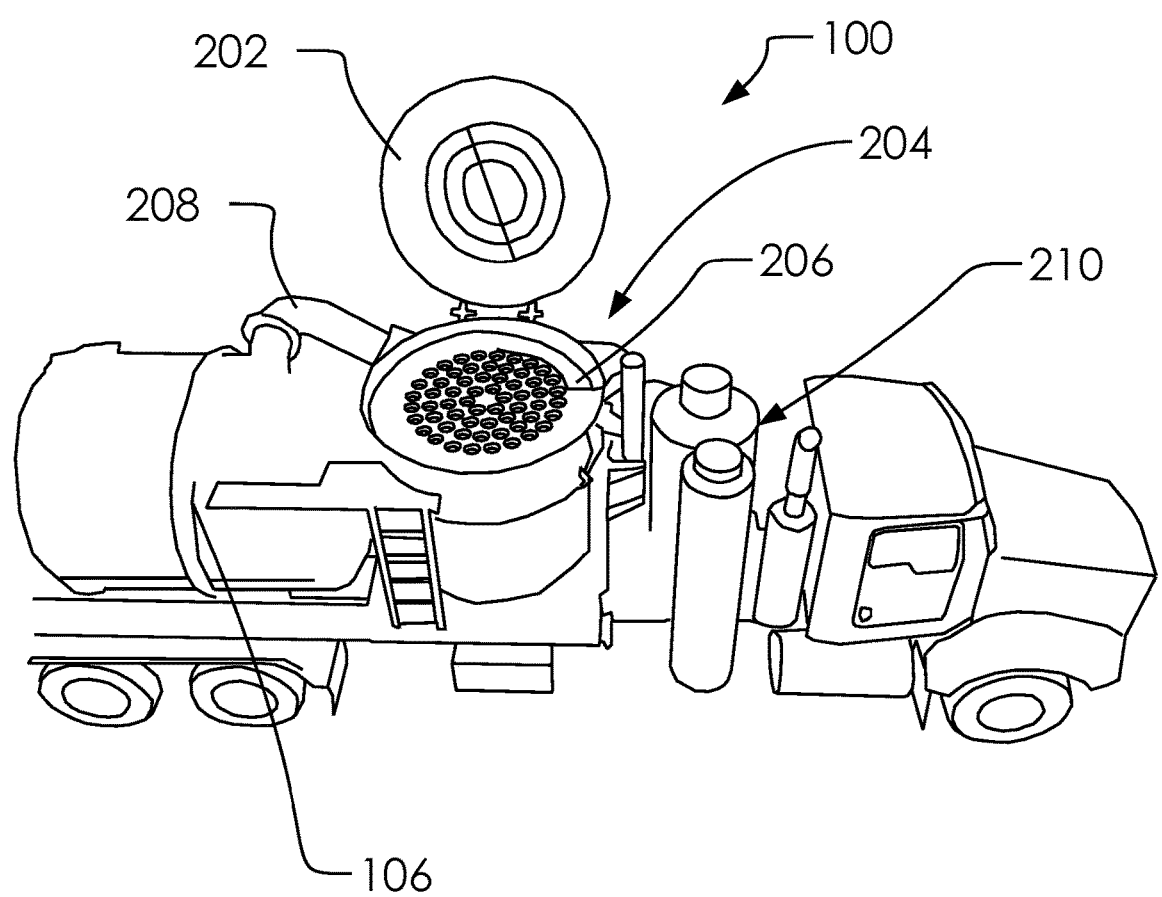
FIG. 2 illustrates a perspective overview view of said service vehicle 102.

FIG. 2 illustrates a perspective overview view of said service vehicle 102.

In one embodiment, said vessel 104 can comprise a substantially cylindrical element having a baghouse head assembly 202 and a baghouse lower assembly 204. Wherein, said baghouse lower assembly 204 can comprise a baghouse inside shell assembly 206 enclosed within said vessel 104.

In one embodiment, said vessel 104 can be connected to said hopper 106 with a connector pipe assembly 208, as illustrated. Said vessel 104 can be connected to a blower units 210, as is known in the art.

In one embodiment, said service vehicle 102 can comprise said baghouse inside shell assembly 206 and said connector pipe assembly 208.

Figure 3:
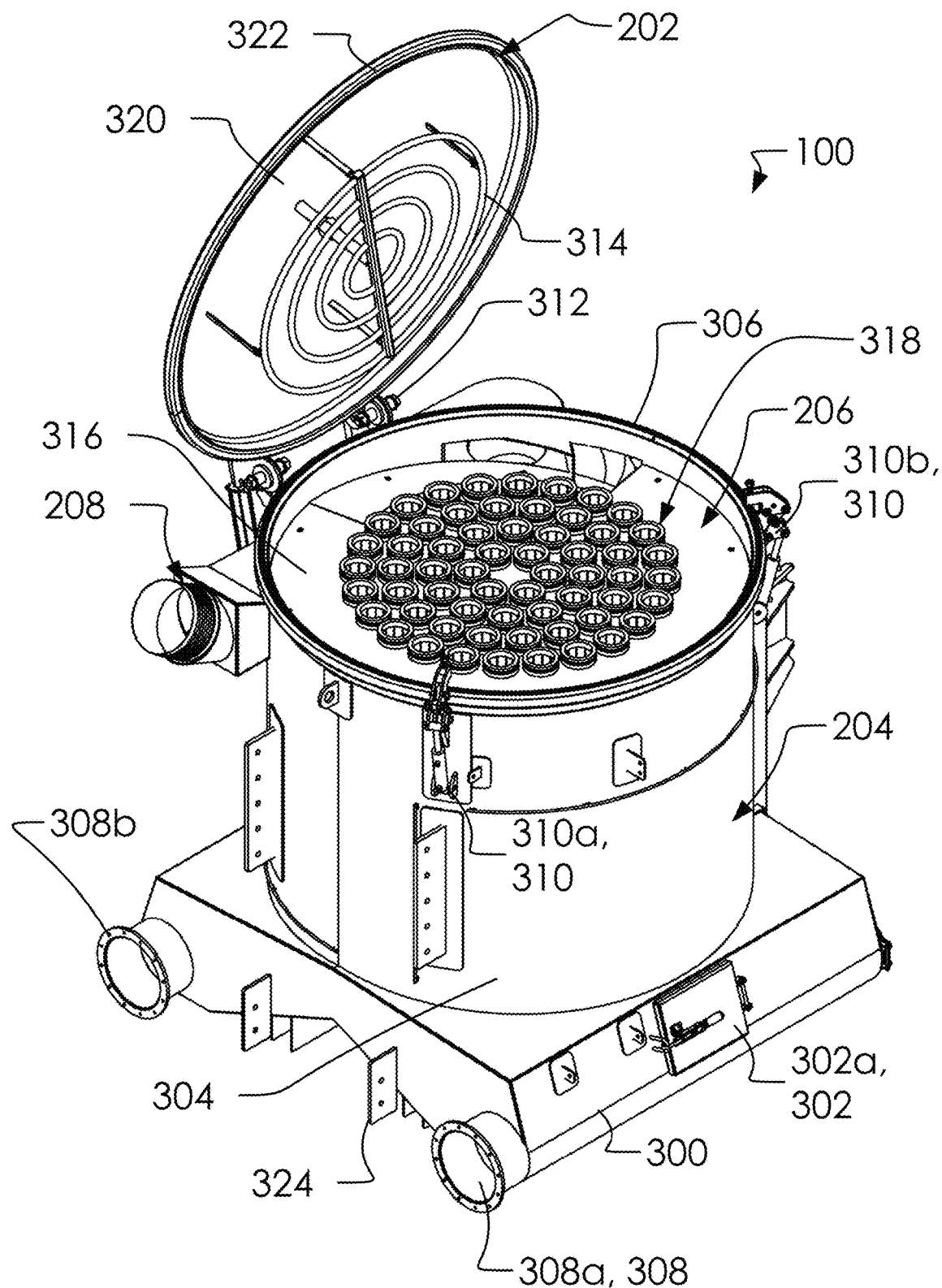
FIG. 3 illustrates a perspective overview view of said filter system 100.

FIG. 3 illustrates a perspective overview view of said filter system 100.

In one embodiment, said filter system 100 can comprise said baghouse head assembly 202 and said baghouse lower assembly 204 being rotateably attached to one another with a hinge assembly 312.

In one embodiment, said baghouse lower assembly 204 can comprise a base portion 300, a side portion 304, an upper rim 306 and a one or more latches 310; said baghouse head assembly 202 can comprise a bag blower rings 314, a lid portion 320 and a lid rim 322. Said baghouse inside shell assembly 206 can comprise an upper surface 316 and a one or more bag filters 318.

said base portion 300 can comprise a one or more side cleaning portals 302 (which can comprise a first side cleaning portal 302a and a second side cleaning portal 302b) and a one or more edge portals 308 (which can comprise a first edge portal 308a and a second edge portal 308b).

Figure 4:
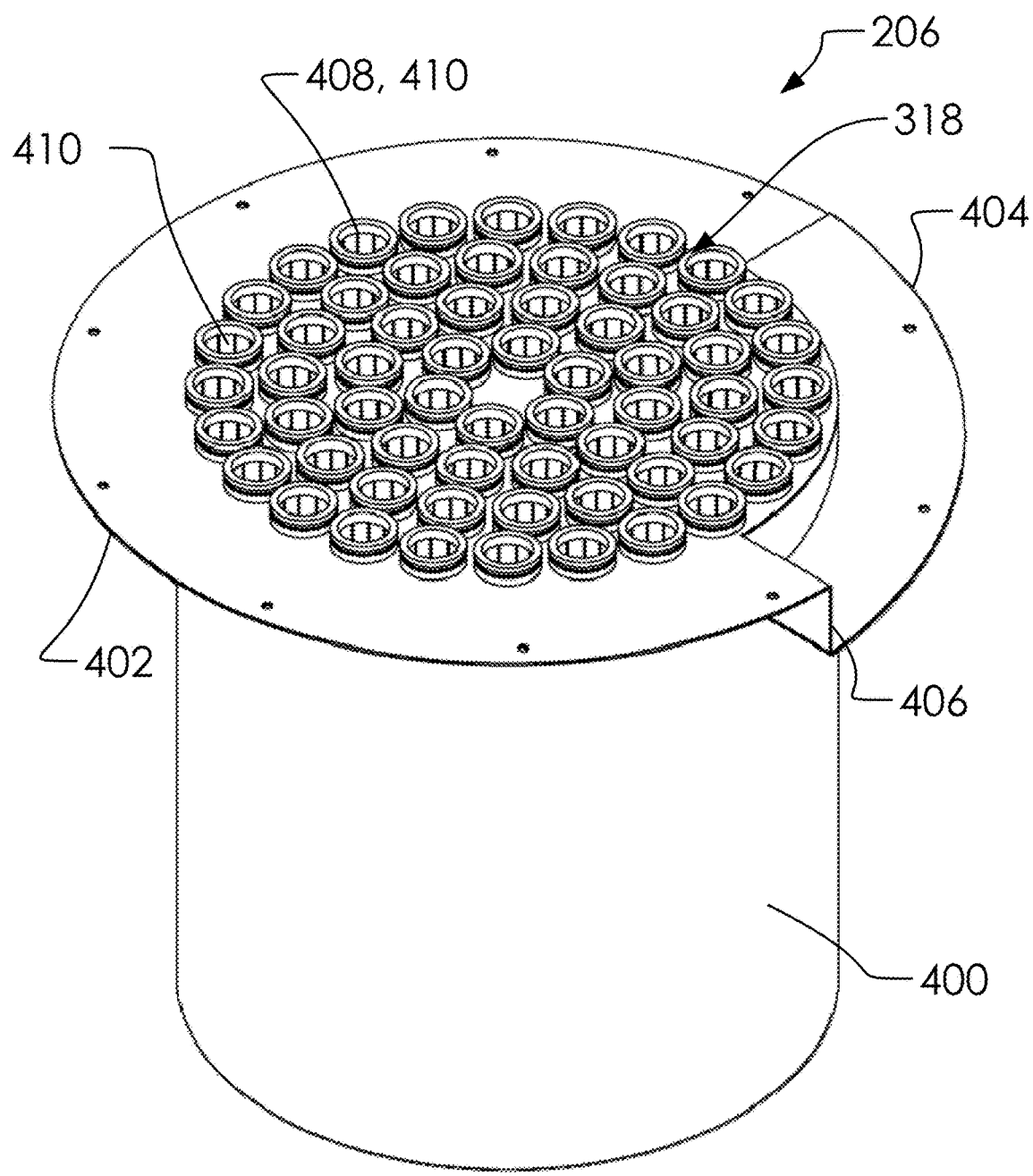
FIG. 4 illustrates a perspective overview view of a baghouse inside shell assembly 206.

FIG. 4 illustrates a perspective overview view of said baghouse inside shell assembly 206.

In one embodiment, said baghouse inside shell assembly 206 can comprise a shell 400, a circumference plate 402, a declined plate 404, a step-up plate 406, and said one or more bag filters 318.

In one embodiment, said one or more bag filters 318 can each comprise a bag cage 408 and a bag portion 410.

In one embodiment, said upper surface 316 of said shell 400 can comprise a substantially horizontal round planar surface with said one or more bag filters 318 protruding therefrom. In one embodiment, said upper surface 316 can comprise said circumference plate 402, said declined plate 404 and said step-up plate 406, as illustrated.

In one embodiment, said bag cage 408 can each selectively hold said bag portion 410. In one embodiment, said bag portion 410 can comprise a textile being selected to capture ash and particulates being collected by said service vehicle 102.

In one embodiment, said declined plate 404 can be relatively below said circumference plate 402. In one embodiment, said declined plate 404 can allow said upper surface 316 to dip down and align with a ducting aperture 610 (illustrated below) so as to allow debris to fall below said upper surface 316.

Figure 5A:
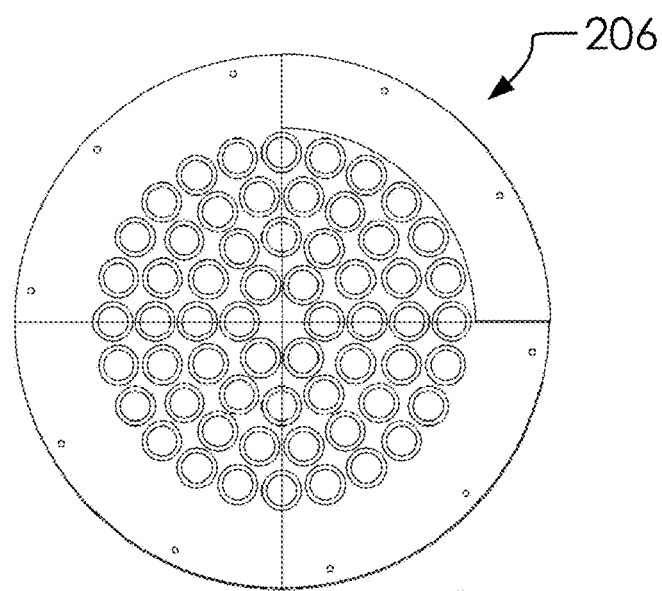
FIGS. 5A, 5B and 5C illustrate an elevated top side, front side, and first side view of said baghouse inside shell assembly 206.
Figure 5B:
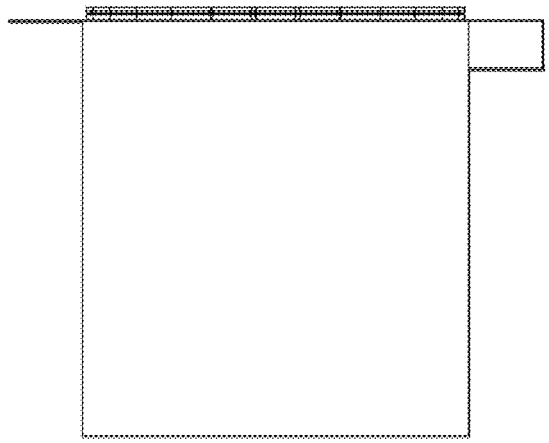
Figure 5C:
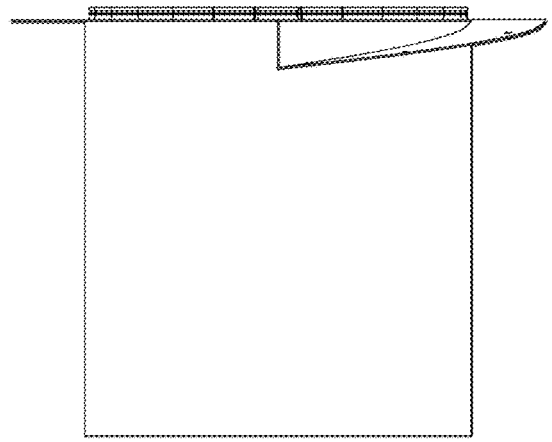

FIGS. 5A, 5B and 5C illustrate an elevated top side, front side, and first side view of said baghouse inside shell assembly 206.

Figure 6:
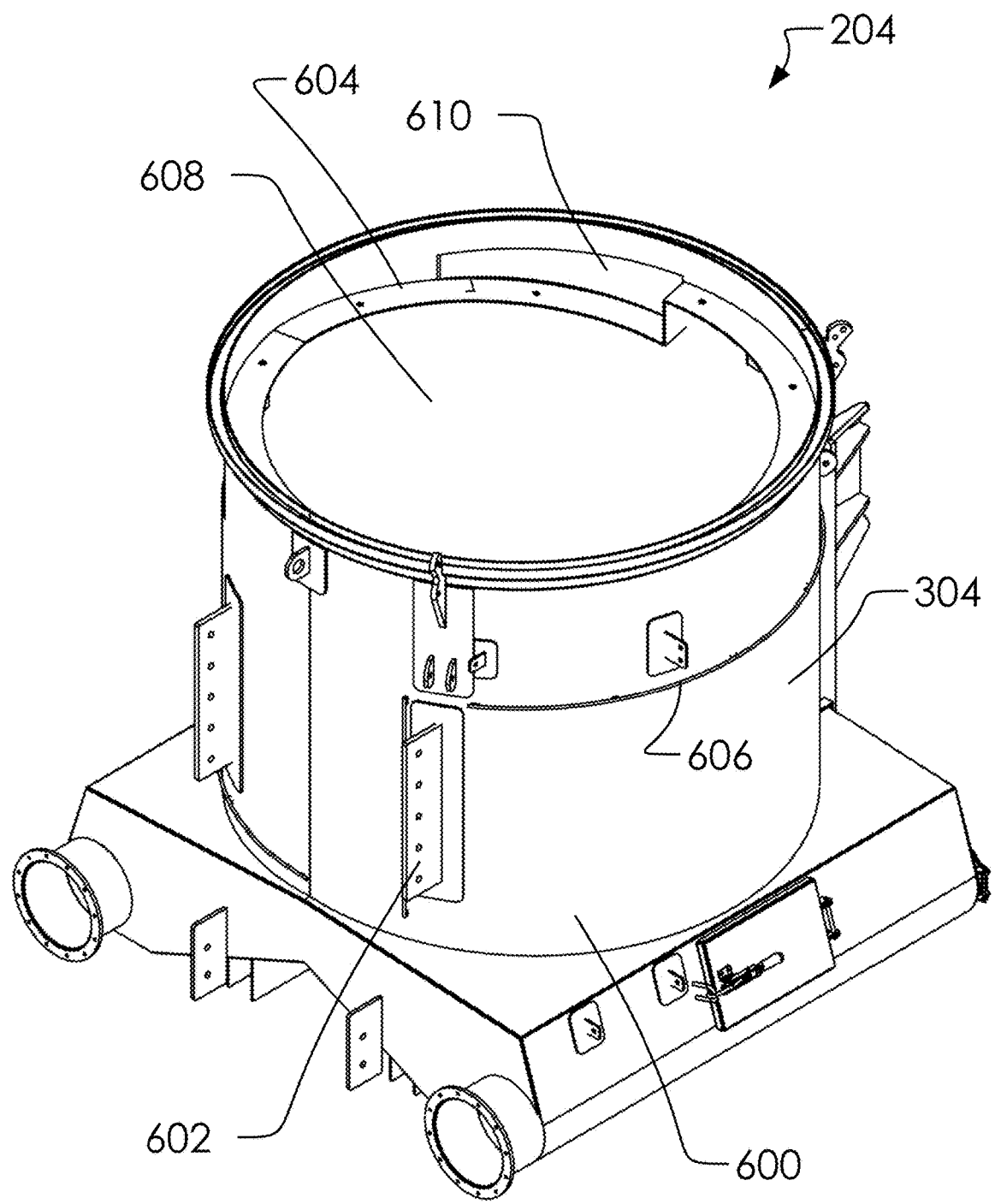
FIG. 6 illustrates a perspective overview view of a baghouse lower assembly 204 without said baghouse inside shell assembly 206.

FIG. 6 illustrates a perspective overview view of said baghouse lower assembly 204 without said baghouse inside shell assembly 206.

In one embodiment, said baghouse lower assembly 204 can comprise a shell 600, a wiring round bar assembly 602, a tube sheets support assembly 604, a wiring round bar assembly 606, a shell cavity 608 and said ducting aperture 610.

In one embodiment, said shell 600 can contain portions of said baghouse inside shell assembly 206. In one embodiment, said tube sheets support assembly 604 can be mounted to a portion of said upper surface 316 of said baghouse inside shell assembly 206. Said shell 600 can comprise said shell cavity 608 within said baghouse lower assembly 204 configured to hold a portion of said baghouse inside shell assembly 206. said ducting aperture 610 can attach to a portion of said connector pipe assembly 208.

Figures 7A, 7B:
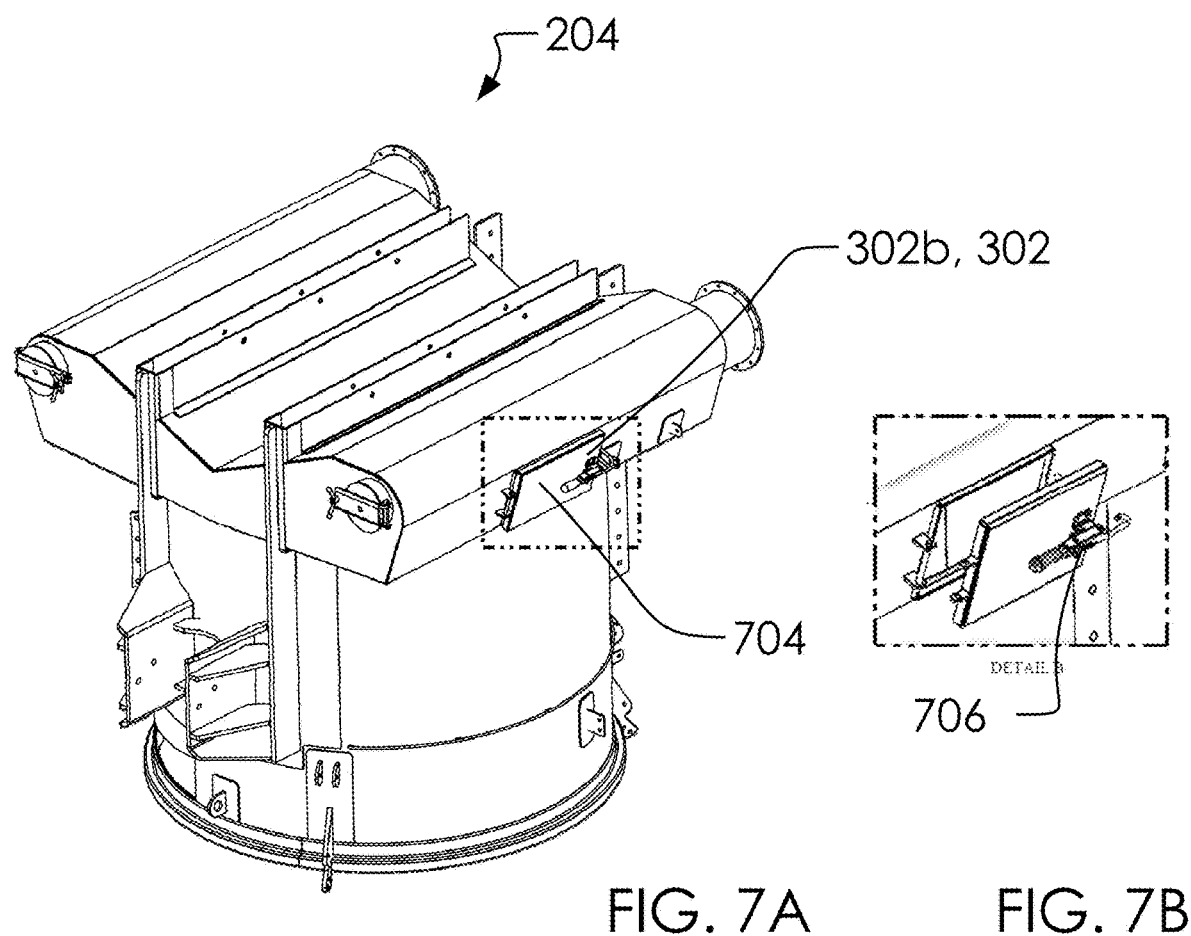
FIGS. 7A and 7B illustrate a perspective bottom side view and overview of said baghouse lower assembly 204, respectively.

FIGS. 7A and 7B illustrate a perspective bottom side view and overview of said baghouse lower assembly 204, respectively.

In one embodiment, said baghouse lower assembly 204 can comprise said first side cleaning portal 302a, said second side cleaning portal 302b, a bag house dust cover 704 and a latching assembly 706.

Figure 8A:
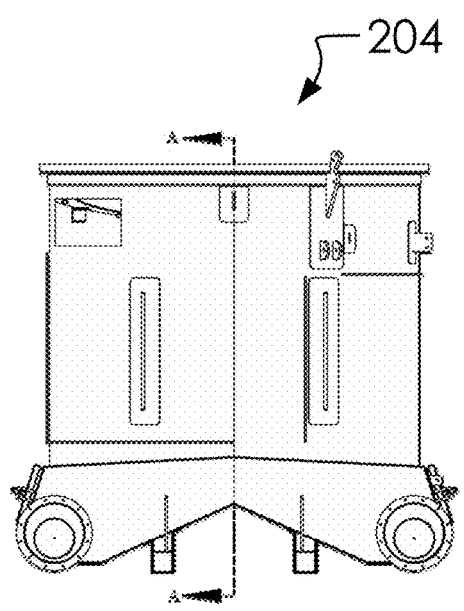
FIGS. 8A and 8B illustrate an elevated front side view and an elevated first side view of said baghouse lower assembly 204, respectively.
Figure 8B:
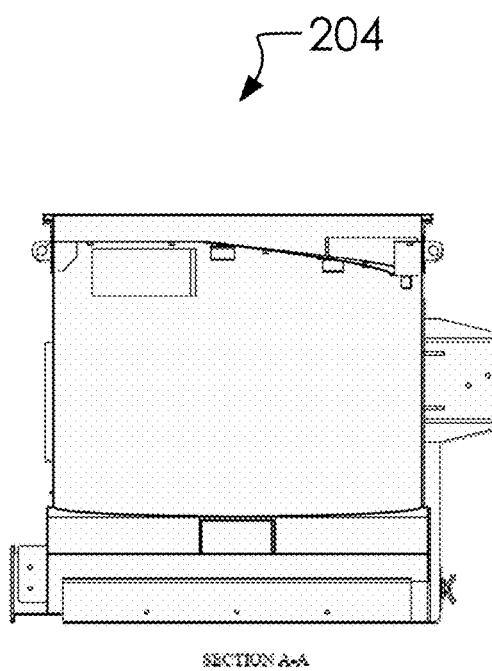

FIGS. 8A and 8B illustrate an elevated front side view and an elevated first side view of said baghouse lower assembly 204, respectively.

Figure 9:
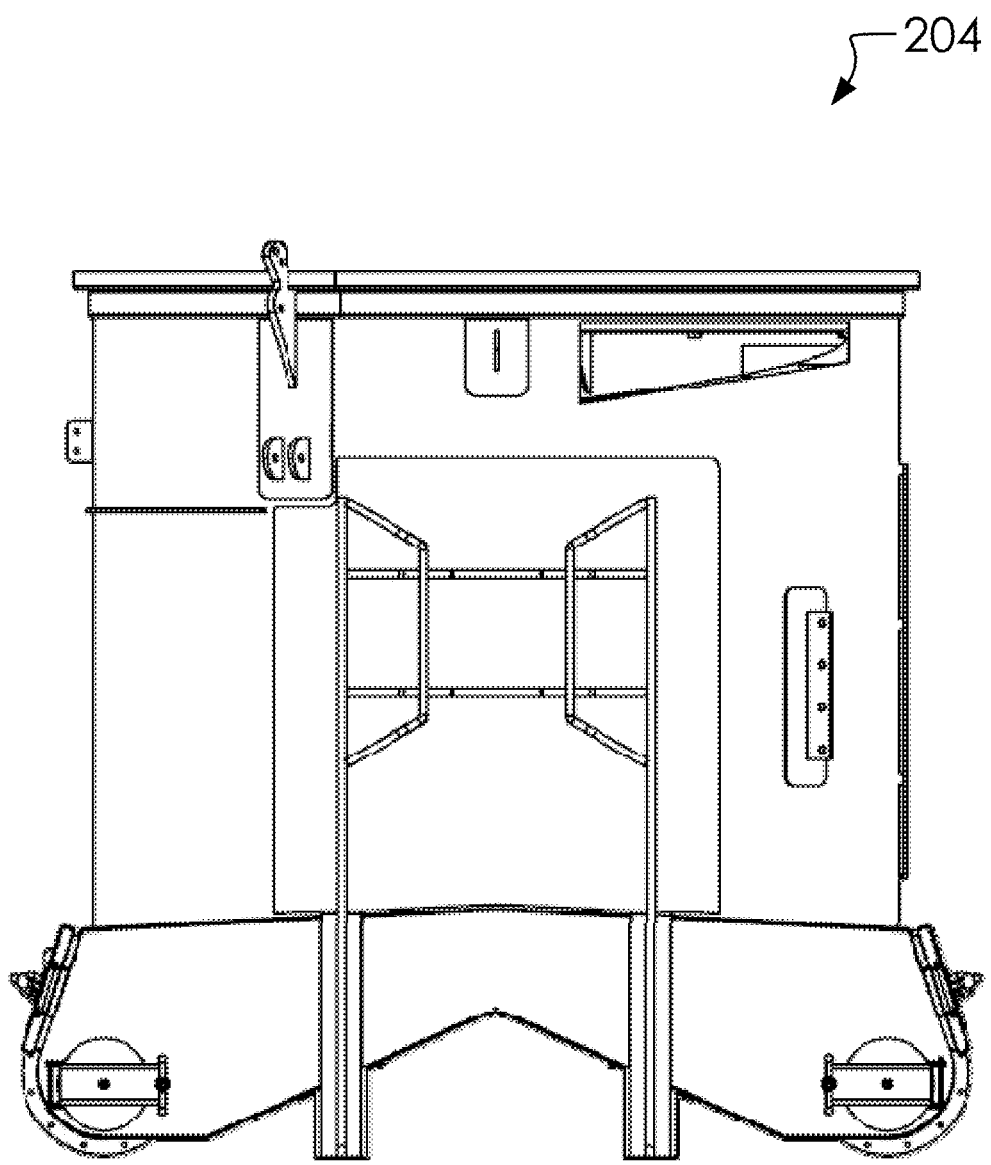
FIG. 9 illustrates an elevated front side view of said baghouse lower assembly 204.

FIG. 9 illustrates an elevated front side view of said baghouse lower assembly 204.

Figures 10A, 10B:
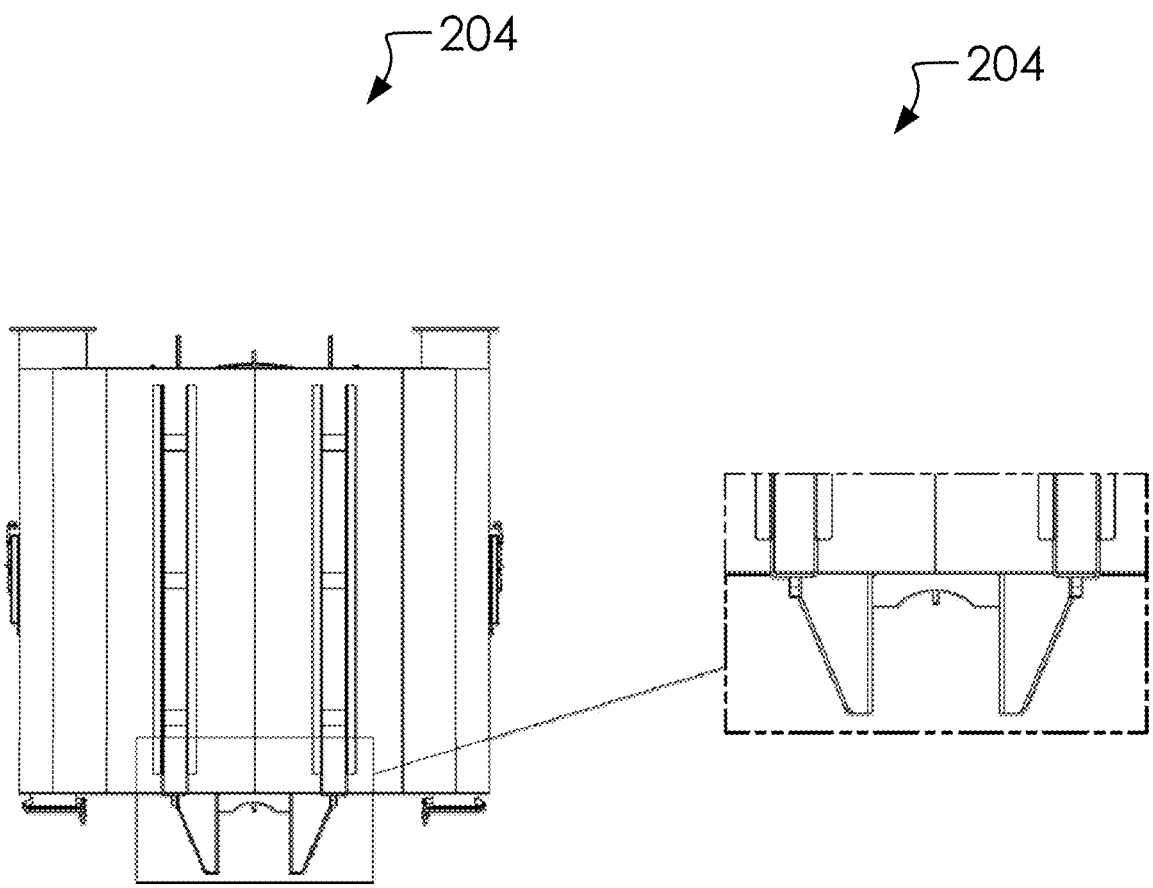
FIGS. 10A and 10B illustrate an elevated front side view of said baghouse lower assembly 204 and a detailed view thereof.

FIGS. 10A and 10B illustrate an elevated front side view of said baghouse lower assembly 204 and a detailed view thereof.

Figures 11A, 11B:
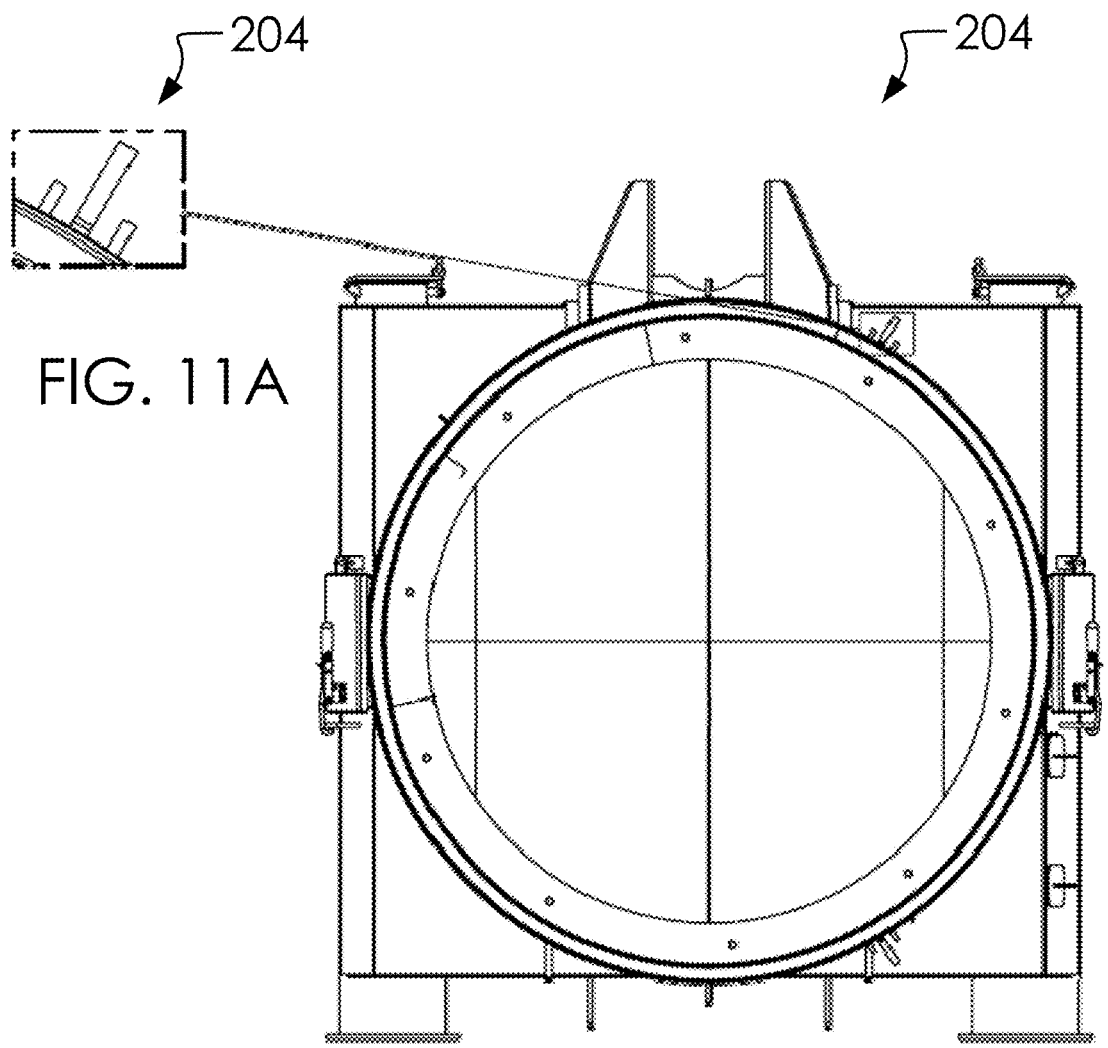
FIGS. 11A and 11B illustrate an elevated top side view of said baghouse lower assembly 204 in detailed and overview.

FIGS. 11A and 11B illustrate an elevated top side view of said baghouse lower assembly 204 in detailed and overview.

Figure 12A:
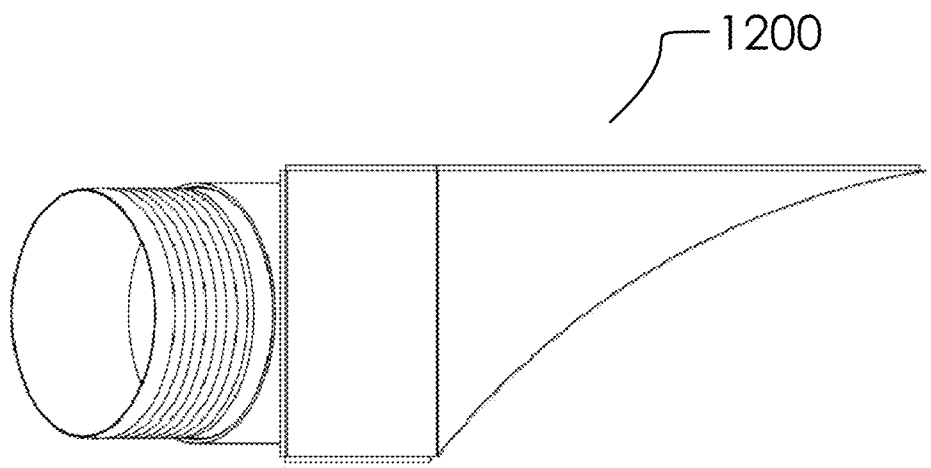
FIGS. 12A, 12B and 12C illustrate an elevated topside, front side, and bottom side view of a baghouse air intake assembly 1200, respectively.
Figure 12B:
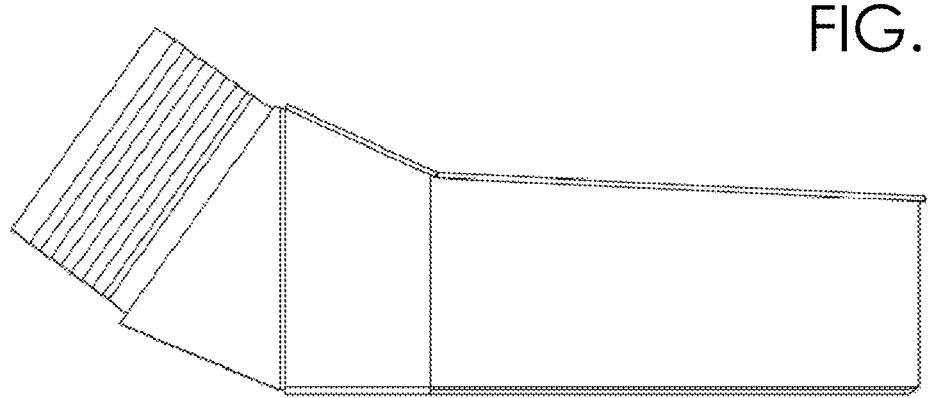
Figure 12C:
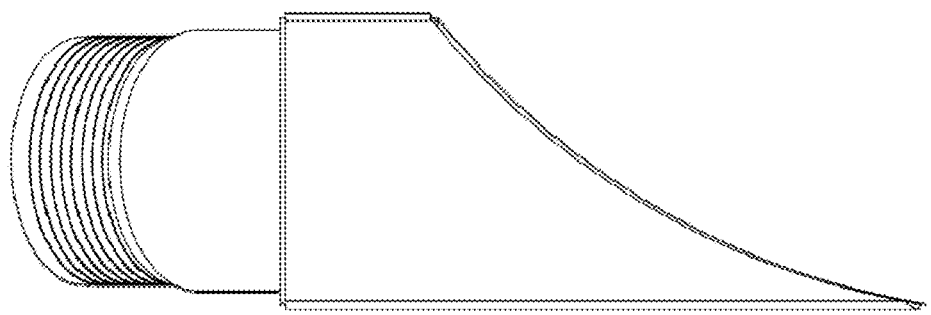

FIGS. 12A, 12B and 12C illustrate an elevated topside, front side, and bottom side view of a baghouse air intake assembly 1200, respectively.

In one embodiment, said filter system 100 can comprise said baghouse air intake assembly 1200.

Figure 13A:
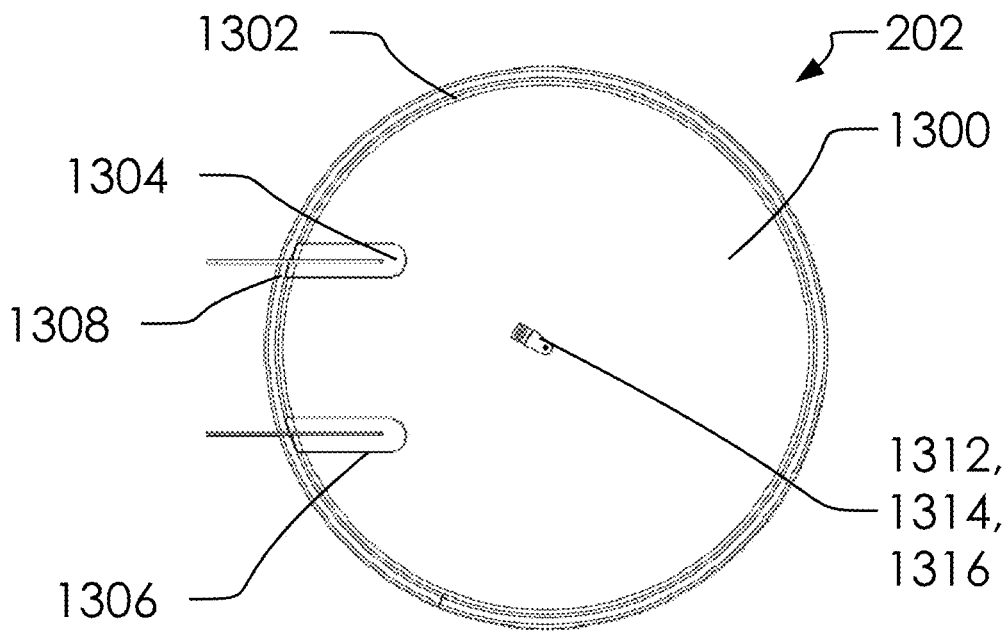
FIGS. 13A, 13B and 13C illustrate an elevated topside, front side and bottom side view of a baghouse head assembly 202.
Figure 13B:
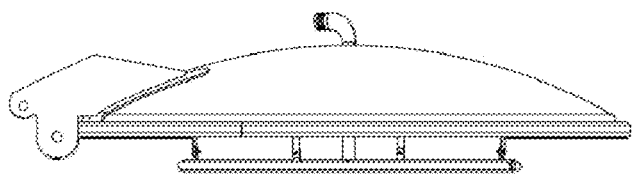
Figure 13C:
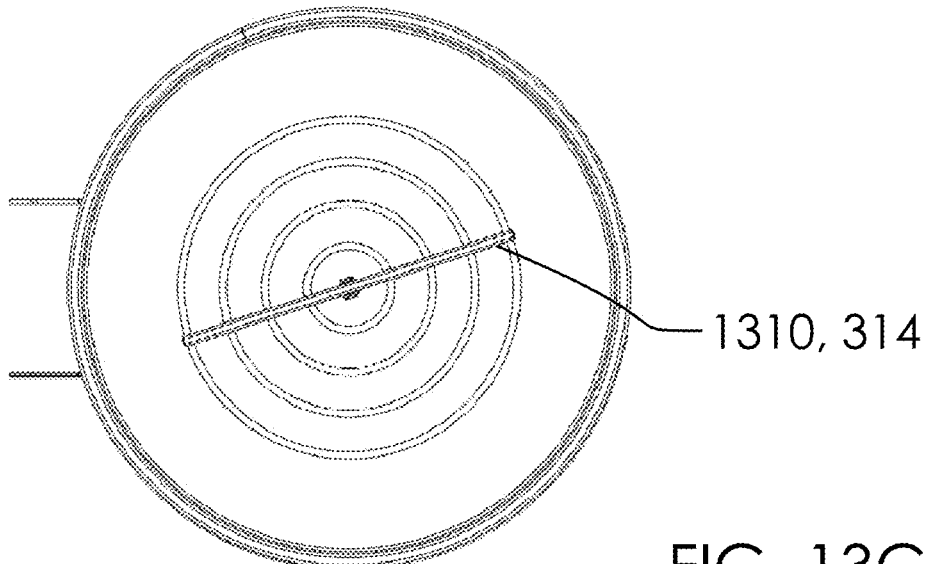

FIGS. 13A, 13B and 13C illustrate an elevated topside, front side and bottom side view of said baghouse head assembly 202.

In one embodiment, said baghouse head assembly 202 can comprise a top portion 1300, a tubing 1302, a hinge plate 1304, a hinge plate 1306, a hinge plate 1308, a blow down assembly 1310, a blowdown inlet pipe 1312, an elbow reducer 1314 and a hose mender 1316.

Figure 14:
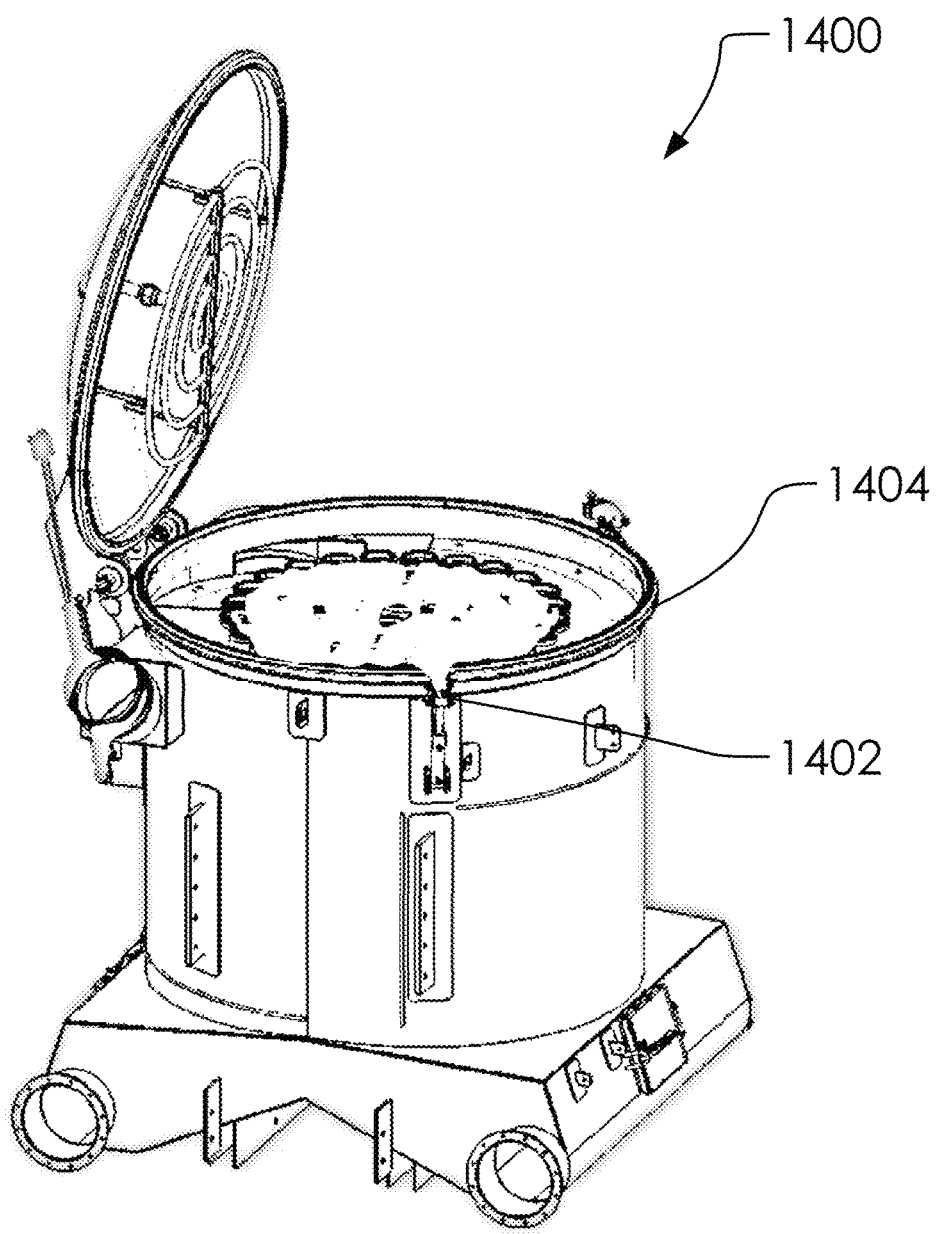
FIG. 14 illustrates a perspective overview view of said filter system 100 in an open configuration 1400.

FIG. 14 illustrates a perspective overview view of said filter system 100 in an open configuration 1400.

In one embodiment, said baghouse head assembly 202 can comprise said open configuration 1400, a door auto clamp assembly 1402 and a back-door gasket 1404.

Figure 15:
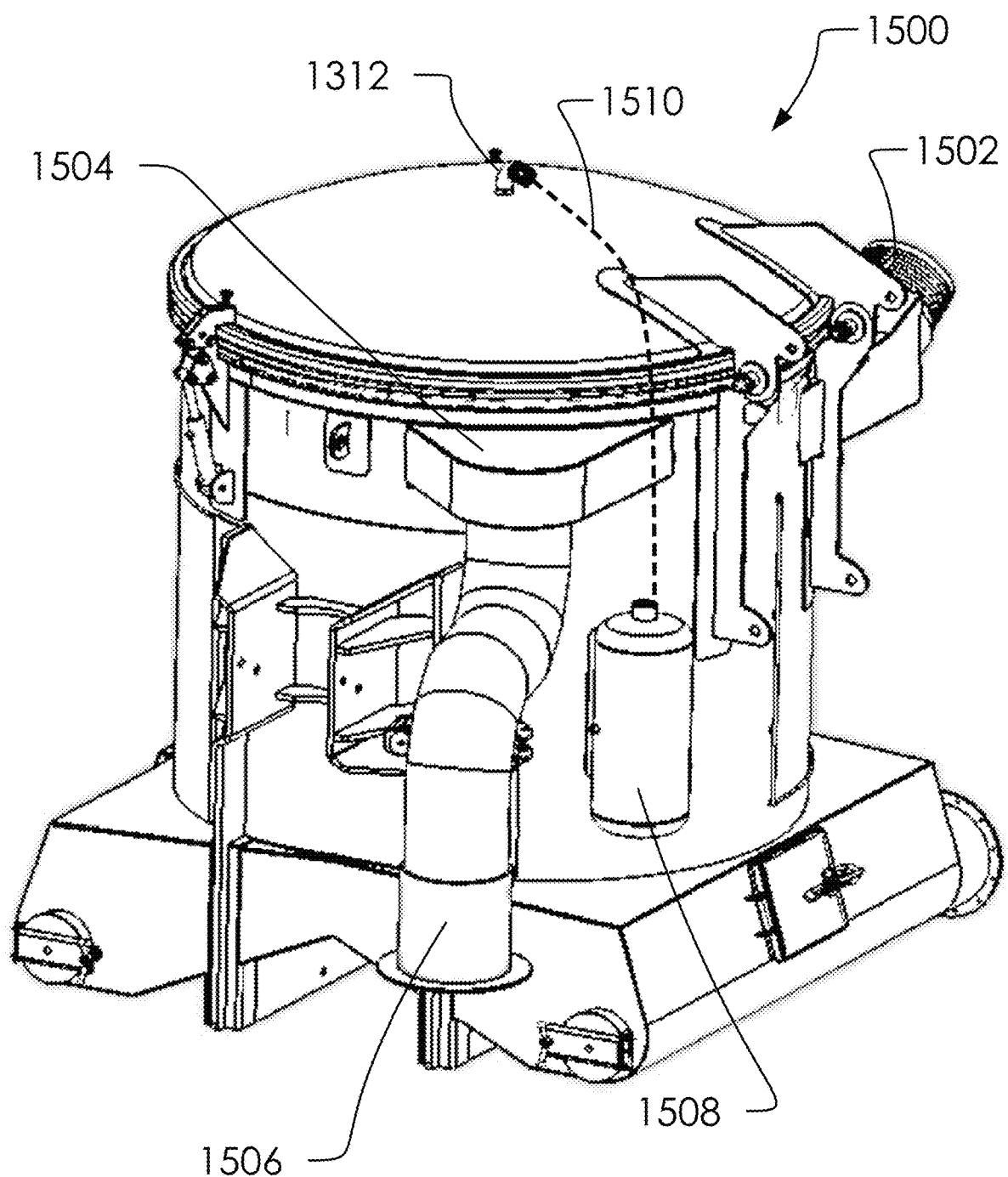
FIG. 15 illustrates a perspective overview view of said filter system 100 in a closed configuration 1500.

FIG. 15 illustrates a perspective overview view of said filter system 100 in a closed configuration 1500.

In one embodiment, said filter system 100 can comprise an inlet 1502, an outlet 1504, an outlet pipe 1506, a reservoir 1508 and a hose 1510. Said hose 1510 can connect said reservoir 1508 and said blowdown inlet pipe 1312. In one embodiment, said reservoir 1508 can comprise pressurized air used to blow out portions of said one or more bag filters 318. In one embodiment, said blowdown inlet pipe 1312 can be in fluid connection with said bag blower rings 314. In one embodiment, said filter system 100 can receive dirty air in said inlet 1502, filter out unwanted debris with said one or more bag filters 318, and expel a cleaned portion of said dirty air from said outlet 1504. In one embodiment, said outlet 1504 can be in fluid connection with a portion of said blower units 210 with said outlet pipe 1506. In one embodiment, said inlet 1502 can connect to said connector pipe assembly 208 to connect said service vehicle 102 and said hopper 106.

Figure 16:
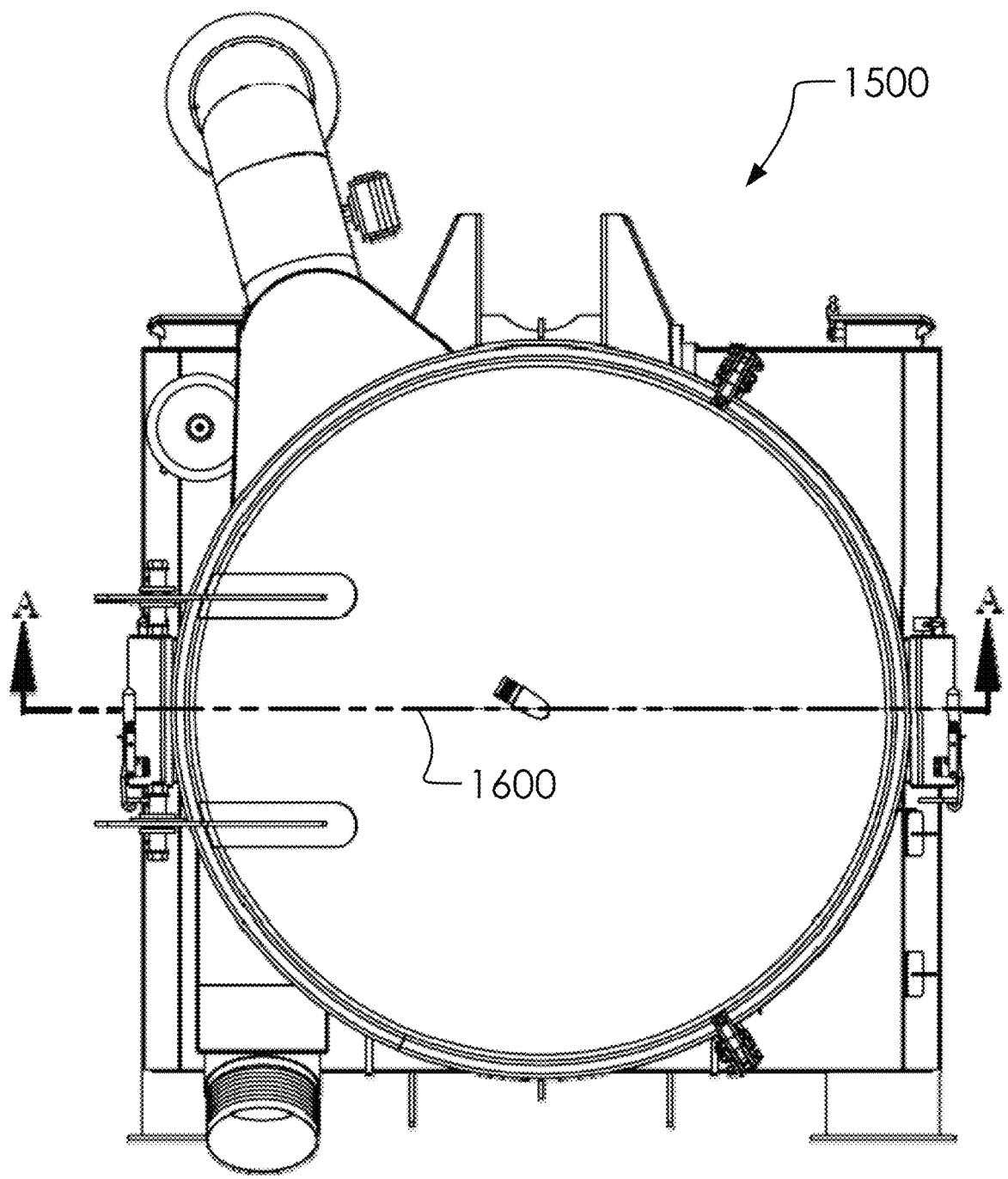
FIG. 16 illustrates an elevated top view of said filter system 100 in said closed configuration 1500 identifying a cross-section A-A 1600.

FIG. 16 illustrates an elevated top view of said filter system 100 in said closed configuration 1500 identifying a cross-section A-A 1600.

Figure 17:
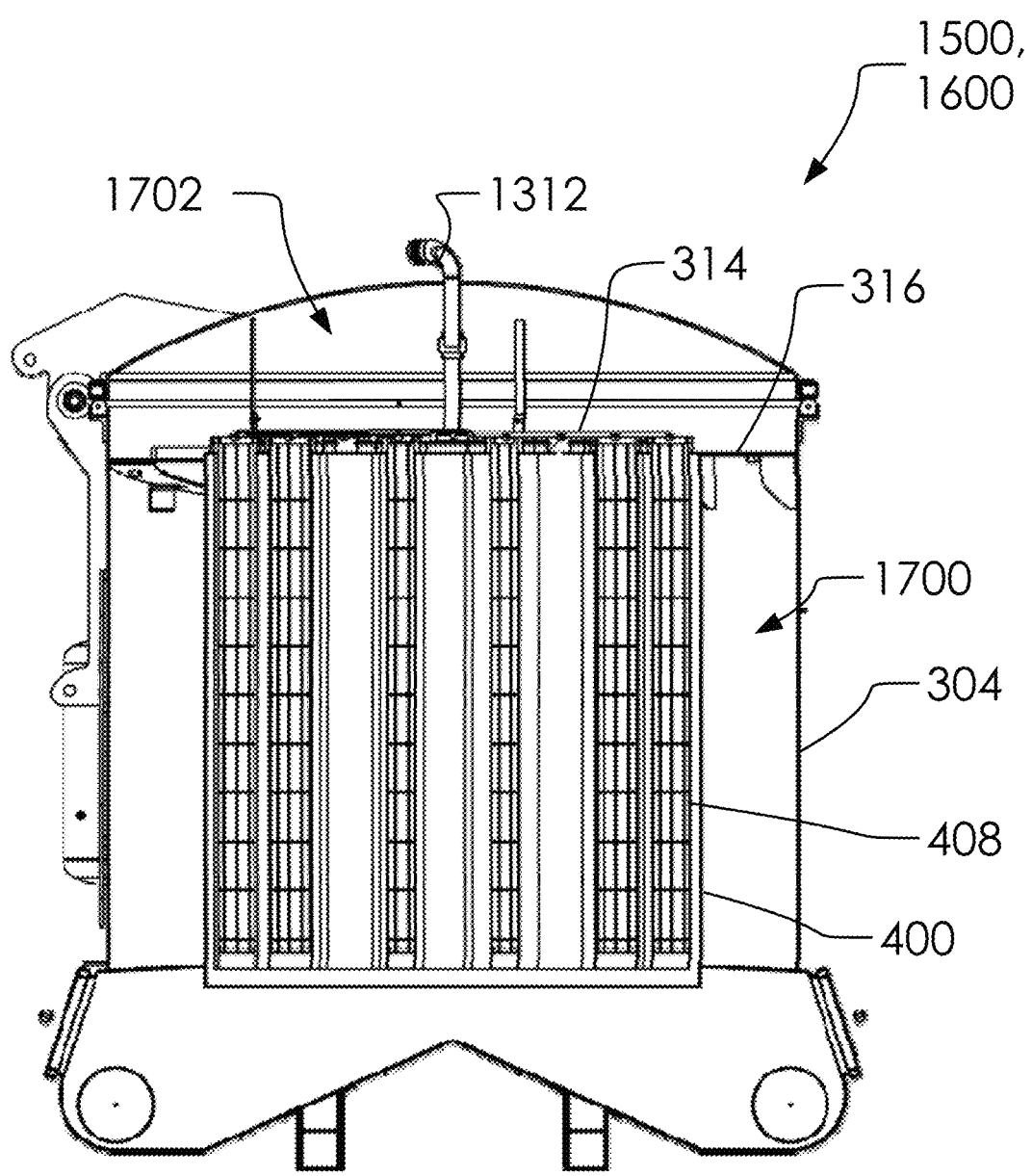
FIG. 17 illustrates an elevated front side view of said closed configuration 1500 in at said cross-section A-A 1600.

FIG. 17 illustrates an elevated front side view of said closed configuration 1500 in at said cross-section A-A 1600.

In one embodiment, said filter system 100 can comprise a lower cavity 1700 and an upper cavity 1702. Said lower cavity 1700 can comprise a cavity between said side portion 304 and said shell 400. Said upper cavity 1702 can comprise a cavity between said upper surface 316 and said lid portion 320. In one embodiment, said one or more bag filters 318 can filter air flow between said lower cavity 1700 and said upper cavity 1702. In one embodiment, said inlet 1502 and said outlet 1504 can be in fluid connection with one another through said lower cavity 1700, said one or more bag filters 318 and said upper cavity 1702.

As illustrated, said blowdown inlet pipe 1312 can receive air and blow it through said bag blower rings 314 and into a portion of said one or more bag filters 318.

As compared with the prior art, the current system is configured to create a cyclone effect in said lower cavity 1700; whereas, the prior art use more than one vessel to create separate cyclone effects in separate vessels.

Figure 18A:
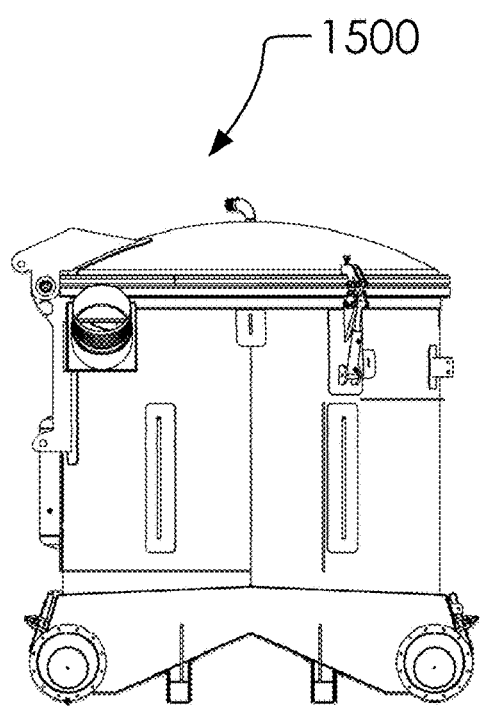
FIGS. 18A and 18B illustrate an elevated front and side view of said open configuration 1400, respectively.
Figure 18B:
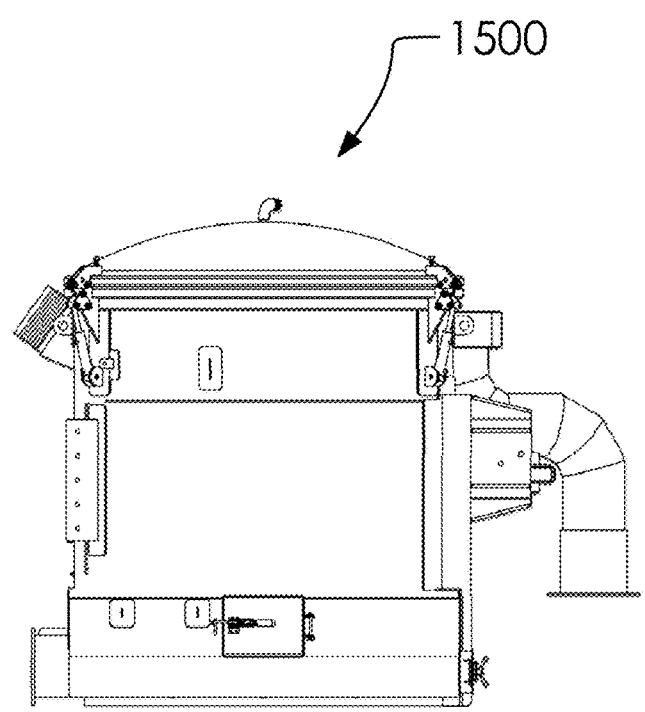

FIGS. 18A and 18B illustrate an elevated front and side view of said open configuration 1400, respectively.

Figure 19A:
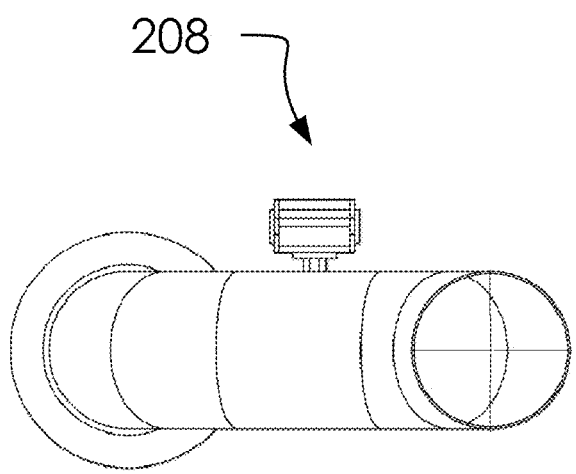
FIGS. 19A, 19B and 19C illustrate an elevated topside, front side and first side view of a connector pipe assembly 208.
Figure 19B:
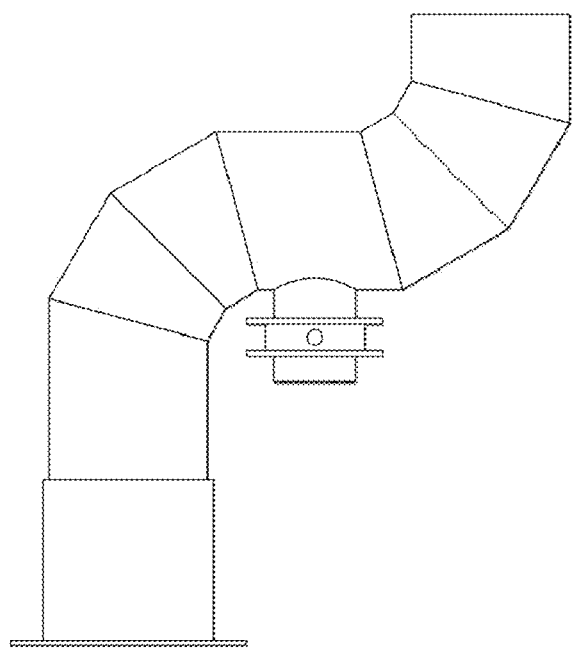
Figure 19C:
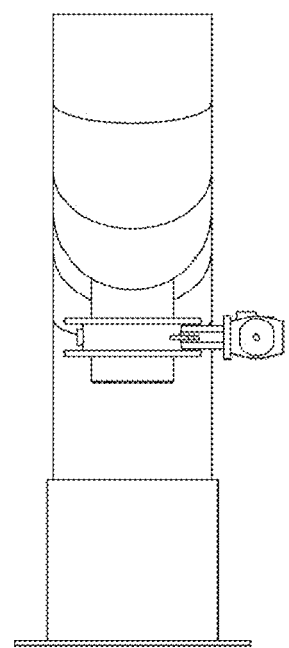

FIGS. 19A, 19B and 19C illustrate an elevated topside, front side and first side view of said connector pipe assembly 208.

Figure 20A:
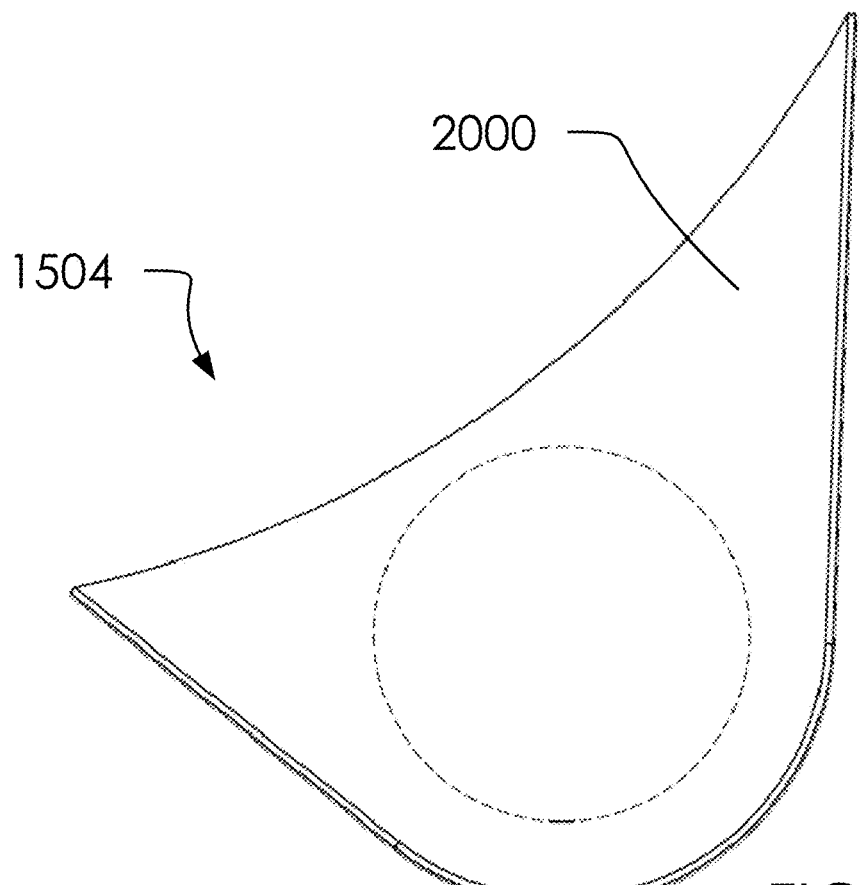
FIGS. 20A and 20B illustrate an elevated topside and front side view of an outlet adapter 2000.
Figure 20B:
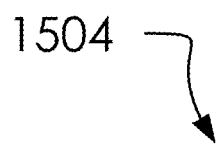

FIGS. 20A and 20B illustrate an elevated topside and front side view of an outlet adapter 2000.

The following sentences are generated from the claims and represent at least one embodiment of the current disclosure: said filter system 100. Said filter system 100 comprises said baghouse head assembly 202, said baghouse lower assembly 204 and said baghouse inside shell assembly 206. Said baghouse head assembly 202 and said baghouse lower assembly 204 are configured to selectively close and open between said open configuration 1400 and said closed configuration 1500. Said baghouse inside shell assembly 206 comprises said upper surface 316 and said one or more bag filters 318. Said filter system 100 comprises said lower cavity 1700 and said upper cavity 1702. Said lower cavity 1700 comprises a space between said side portion 304 of said baghouse lower assembly 204 and said shell 400 of said baghouse inside shell assembly 206. Said upper cavity 1702 comprises a space between said upper surface 316 of said baghouse inside shell assembly 206 and said lid portion 320 or said baghouse head assembly 202. Said one or more bag filters 318 are configured to filter air flow between said lower cavity 1700 and said upper cavity 1702. Said inlet 1502 and said outlet 1504 are in fluid connection with one another through said lower cavity 1700, said one or more bag filters 318 and said upper cavity 1702.

In one embodiment, said filter system 100 is mounted on said service vehicle 102. Said baghouse head assembly 202 and said baghouse lower assembly 204 comprise said vessel 104 mounted on said service vehicle 102.

In one embodiment, said filter system 100 comprise said one or more latches 310 and said hinge assembly 312. Said baghouse head assembly 202 and said baghouse lower assembly 204 are rotateably attached to one another with said hinge assembly 312. Said one or more latches 310 are configured to selectively seal said baghouse head assembly 202 and said baghouse lower assembly 204 together.

In one embodiment, said one or more bag filters 318 each comprise said bag cage 408 and said bag portion 410. said bag portion 410 comprise a textile configured to capture debris between said inlet 1502 and said outlet 1504.

In one embodiment, said baghouse inside shell assembly 206 comprises said upper surface 316 between said lower cavity 1700 and said upper cavity 1702. Said upper surface 316 comprises a planar surface dividing said shell cavity 608 within said baghouse lower assembly 204.

In one embodiment, said upper surface 316 of said shell 400 of said baghouse inside shell assembly 206 comprises said one or more bag filters 318 protruding therefrom.

In one embodiment, said upper surface 316 of said shell 400 of said baghouse inside shell assembly 206 comprises said circumference plate 402, said declined plate 404 and said step-up plate 406. Said declined plate 404 is angled down from said circumference plate 402 to expose said ducting aperture 610 in a side portion of said baghouse lower assembly 204.

In one embodiment, said ducting aperture 610 is below said circumference plate 402.

In one embodiment, said filter system 100 further comprises said bag blower rings 314 in said baghouse head assembly 202. Said bag blower rings 314 are aligned with a portion of said one or more bag filters 318. Said blowdown inlet pipe 1312 are configured receive and blow air through said bag blower rings 314 and into a portion of said one or more bag filters 318.

In one embodiment, said filter system 100 comprises said baghouse head assembly 202, said baghouse lower assembly 204 and said baghouse inside shell assembly 206. Said baghouse head assembly 202 and said baghouse lower assembly 204 are configured to selectively close and open between said open configuration 1400 and said closed configuration 1500. Said baghouse inside shell assembly 206 comprises said upper surface 316 and said one or more bag filters 318. Said filter system 100 comprises said lower cavity 1700 and said upper cavity 1702. Said lower cavity 1700 comprises a space between said side portion 304 of said baghouse lower assembly 204 and said shell 400 of said baghouse inside shell assembly 206. Said upper cavity 1702 comprises a space between said upper surface 316 of said baghouse inside shell assembly 206 and said lid portion 320 or said baghouse head assembly 202. Said one or more bag filters 318 are configured to filter air flow between said lower cavity 1700 and said upper cavity 1702. Said inlet 1502 and said outlet 1504 are in fluid connection with one another through said lower cavity 1700, said one or more bag filters 318 and said upper cavity 1702. Said filter system 100 is mounted on said service vehicle 102. Said baghouse head assembly 202 and said baghouse lower assembly 204 comprise said vessel 104 mounted on said service vehicle 102. Said filter system 100 comprise said one or more latches 310 and said hinge assembly 312. Said baghouse head assembly 202 and said baghouse lower assembly 204 are rotateably attached to one another with said hinge assembly 312. Said one or more latches 310 are configured to selectively seal said baghouse head assembly 202 and said baghouse lower assembly 204 together. Said one or more bag filters 318 each comprise said bag cage 408 and said bag portion 410. said bag portion 410 comprise a textile configured to capture debris between said inlet 1502 and said outlet 1504. Said baghouse inside shell assembly 206 comprises said upper surface 316 between said lower cavity 1700 and said upper cavity 1702. Said upper surface 316 comprises a planar surface dividing said shell cavity 608 within said baghouse lower assembly 204. Said upper surface 316 of said shell 400 of said baghouse inside shell assembly 206 comprises said one or more bag filters 318 protruding therefrom. said upper surface 316 of said shell 400 of said baghouse inside shell assembly 206 comprises said circumference plate 402, said declined plate 404 and said step-up plate 406. Said declined plate 404 is angled down from said circumference plate 402 to expose said ducting aperture 610 in a side portion of said baghouse lower assembly 204. Said ducting aperture 610 is below said circumference plate 402. Said filter system 100 further comprises said bag blower rings 314 in said baghouse head assembly 202. Said bag blower rings 314 are aligned with a portion of said one or more bag filters 318. Said blowdown inlet pipe 1312 are configured receive and blow air through said bag blower rings 314 and into a portion of said one or more bag filters 318.

Click or tap here to enter text.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A filter system, wherein:
   said filter system comprises a baghouse head assembly, a baghouse lower assembly and a baghouse inside shell assembly;
   said baghouse head assembly and said baghouse lower assembly are configured to selectively close and open between an open configuration and a closed configuration;
   said baghouse inside shell assembly comprises an upper surface and a one or more bag filters;
   said filter system comprises a lower cavity and an upper cavity;
   said lower cavity comprises a space between a side portion of said baghouse lower assembly and a shell of said baghouse inside shell assembly;
   said upper cavity comprises a space between said upper surface of said baghouse inside shell assembly and a lid portion or said baghouse head assembly;
   said one or more bag filters are configured to filter air flow between said lower cavity and said upper cavity;
   an inlet and an outlet are in fluid connection with one another through said lower cavity, said one or more bag filters and said upper cavity;
   said baghouse inside shell assembly comprises said upper surface between said lower cavity and said upper cavity;
   said upper surface comprises a planar surface dividing a shell cavity within said baghouse lower assembly;
   said upper surface of said shell of said baghouse inside shell assembly comprises a circumference plate, a declined plate and a step-up plate; and
   said declined plate is angled down from said circumference plate to expose a ducting aperture in a side portion of said baghouse lower assembly.

2. The filter system from claim 1, wherein:
   said filter system is mounted on a service vehicle; and
   said baghouse head assembly and said baghouse lower assembly comprise a vessel mounted on said service vehicle.

3. The filter system from claim 1, wherein:
   said filter system comprise a one or more latches and a hinge assembly;
   said baghouse head assembly and said baghouse lower assembly are rotateably attached to one another with said hinge assembly; and
   said one or more latches are configured to selectively seal said baghouse head assembly and said baghouse lower assembly together.

4. The filter system from claim 1, wherein:
   said one or more bag filters each comprise a bag cage and a bag portion; and
   said bag portion comprise a textile configured to capture debris between said inlet and said outlet.

5. The filter system from claim 1, wherein:
   said upper surface of said shell of said baghouse inside shell assembly comprises said one or more bag filters protruding therefrom.

6. The filter system from claim 1, wherein:
said ducting aperture is below said circumference plate.

7. The filter system from claim 1, wherein:
said filter system further comprises a bag blower rings in said baghouse head assembly;
said bag blower rings are aligned with a portion of said one or more bag filters; and
a blowdown inlet pipe are configured receive and blow air through said bag blower rings and into a portion of said one or more bag filters.

8. A filter system, wherein:
said filter system comprises a baghouse head assembly, a baghouse lower assembly and a baghouse inside shell assembly;
said baghouse head assembly and said baghouse lower assembly are configured to selectively close and open between an open configuration and a closed configuration;
said baghouse inside shell assembly comprises an upper surface and a one or more bag filters;
said filter system comprises a lower cavity and an upper cavity;
said lower cavity comprises a space between a side portion of said baghouse lower assembly and a shell of said baghouse inside shell assembly;
said upper cavity comprises a space between said upper surface of said baghouse inside shell assembly and a lid portion or said baghouse head assembly;
said one or more bag filters are configured to filter air flow between said lower cavity and said upper cavity;
an inlet and an outlet are in fluid connection with one another through said lower cavity, said one or more bag filters and said upper cavity;
said filter system is mounted on a service vehicle;
said baghouse head assembly and said baghouse lower assembly comprise a vessel mounted on said service vehicle;
said filter system comprise a one or more latches and a hinge assembly;
said baghouse head assembly and said baghouse lower assembly are rotateably attached to one another with said hinge assembly;
said one or more latches are configured to selectively seal said baghouse head assembly and said baghouse lower assembly together;
said one or more bag filters each comprise a bag cage and a bag portion;
said bag portion comprise a textile configured to capture debris between said inlet and said outlet;
said baghouse inside shell assembly comprises said upper surface between said lower cavity and said upper cavity;
said upper surface comprises a planar surface dividing a shell cavity within said baghouse lower assembly;
said upper surface of said shell of said baghouse inside shell assembly comprises said one or more bag filters protruding therefrom;
said upper surface of said shell of said baghouse inside shell assembly comprises a circumference plate, a declined plate and a step-up plate;
said declined plate is angled down from said circumference plate to expose a ducting aperture in a side portion of said baghouse lower assembly;
said ducting aperture is below said circumference plate;
said filter system further comprises a bag blower rings in said baghouse head assembly;
said bag blower rings are aligned with a portion of said one or more bag filters; and
a blowdown inlet pipe are configured receive and blow air through said bag blower rings and into a portion of said one or more bag filters.

9. A filter system, wherein:
said filter system comprises a baghouse head assembly, a baghouse lower assembly and a baghouse inside shell assembly;
said baghouse head assembly and said baghouse lower assembly are configured to selectively close and open between an open configuration and a closed configuration;
said baghouse inside shell assembly comprises an upper surface and a one or more bag filters;
said filter system comprises a lower cavity and an upper cavity;
said lower cavity comprises a space between a side portion of said baghouse lower assembly and a shell of said baghouse inside shell assembly;
said upper cavity comprises a space between said upper surface of said baghouse inside shell assembly and a lid portion or said baghouse head assembly;
said one or more bag filters are configured to filter air flow between said lower cavity and said upper cavity;
an inlet and an outlet are in fluid connection with one another through said lower cavity, said one or more bag filters and said upper cavity;
said filter system further comprises a bag blower rings in said baghouse head assembly;
said bag blower rings are aligned with a portion of said one or more bag filters; and
a blowdown inlet pipe are configured receive and blow air through said bag blower rings and into a portion of said one or more bag filters.

10. The filter system from claim 9, wherein:
said filter system is mounted on a service vehicle; and
said baghouse head assembly and said baghouse lower assembly comprise a vessel mounted on said service vehicle.

11. The filter system from claim 9, wherein:
said filter system comprise a one or more latches and a hinge assembly;
said baghouse head assembly and said baghouse lower assembly are rotateably attached to one another with said hinge assembly; and
said one or more latches are configured to selectively seal said baghouse head assembly and said baghouse lower assembly together.

12. The filter system from claim 9, wherein:
said one or more bag filters each comprise a bag cage and a bag portion; and
said bag portion comprise a textile configured to capture debris between said inlet and said outlet.

13. The filter system from claim 9, wherein:
said baghouse inside shell assembly comprises said upper surface between said lower cavity and said upper cavity; and
said upper surface comprises a planar surface dividing a shell cavity within said baghouse lower assembly.

14. The filter system from claim 13, wherein:
said upper surface of said shell of said baghouse inside shell assembly comprises said one or more bag filters protruding therefrom.

15. The filter system from claim 13, wherein:
said upper surface of said shell of said baghouse inside shell assembly comprises a circumference plate, a declined plate and a step-up plate; and
said declined plate is angled down from said circumference plate to expose a ducting aperture in a side portion of said baghouse lower assembly.

16. The filter system from claim 15, wherein:
said ducting aperture is below said circumference plate.

\* \* \* \* \*